United States Patent
Hamada et al.

(10) Patent No.: US 9,594,289 B2
(45) Date of Patent: Mar. 14, 2017

(54) LENS DRIVE UNIT AND IMAGING APPARATUS

(71) Applicant: Sony Corporation, Tokyo (JP)

(72) Inventors: Masayoshi Hamada, Tokyo (JP); Takashi Terai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 825 days.

(21) Appl. No.: 13/865,225

(22) Filed: Apr. 18, 2013

(65) Prior Publication Data
US 2013/0333495 A1 Dec. 19, 2013

(30) Foreign Application Priority Data
Jun. 14, 2012 (JP) ................... 2012-134776

(51) Int. Cl.
| | | |
|---|---|---|
| G02B 15/14 | (2006.01) | |
| G02B 7/02 | (2006.01) | |
| G03B 17/00 | (2006.01) | |
| G03B 3/10 | (2006.01) | |
| F16H 19/02 | (2006.01) | |
| G02B 7/10 | (2006.01) | |

(52) U.S. Cl.
CPC ............ *G03B 3/10* (2013.01); *F16H 19/02* (2013.01); *G02B 7/10* (2013.01); *G02B 7/102* (2013.01); *Y10T 74/18272* (2015.01)

(58) Field of Classification Search
CPC .......... G02B 3/00; G02B 7/10; G02B 25/002; G02B 7/02; G02B 7/04; G02B 7/08; G02B 7/102; G02B 21/14; F21V 9/08; G03B 17/14; H04N 5/2254; H04N 5/2251; H04N 5/2253
USPC ....... 359/694, 696, 642, 704, 809–810, 703, 359/811–830; 362/465; 396/529–530; 348/335, 340, 373–374
See application file for complete search history.

(56) References Cited

U.S. PATENT DOCUMENTS

| | | | | |
|---|---|---|---|---|
| 4,235,509 A | * | 11/1980 | Takabayashi | G02B 7/08 359/380 |
| 5,630,771 A | * | 5/1997 | Weber | G02B 7/04 359/822 |
| 2006/0193039 A1 | * | 8/2006 | Yamauchi | H04N 5/2253 359/407 |

FOREIGN PATENT DOCUMENTS

JP 06-011636 1/1994

* cited by examiner

*Primary Examiner* — Dawayne A Pinkney
(74) *Attorney, Agent, or Firm* — Chip Law Group (57) ABSTRACT

A lens drive unit includes: a driven member that moves a lens in an optical axis direction; a first gear rotated by a drive force of a drive motor; a second gear rotated by a drive force of a manual operation section; a third gear that engages with the first gear and the second gear and is rotated when the first gear is rotated but the second gear is not rotated whereas rotated when the second gear is rotated but the first gear is not rotated; and a fourth gear rotated when the third gear is rotated to transmit the drive force of the drive motor or the drive force of the manual operation section to the driven member, wherein the reduction ratio of the fourth gear to the first gear is set to be greater than the reduction ratio of the fourth gear to the second gear.

8 Claims, 10 Drawing Sheets

LENS DRIVE UNIT AND IMAGING APPARATUS

FIELD

The present technology relates to a technical field of a lens drive unit and an imaging apparatus, and particularly to a technical field of size reduction and operability improvement by setting the reduction ratio of a fourth gear to a first gear that are rotated by a drive force of a drive motor to be greater than the reduction ratio of the fourth gear to a second gear that are rotated by a drive force of a manual operation section.

BACKGROUND

In some still cameras and a variety of other imaging apparatus, for example, an interchangeable lens that functions as a lens barrel is detachable from an apparatus body.

In an interchangeable lens of this type, a lens drive unit having a variety of gears moves lenses in the interchangeable lens in the optical axis direction for focusing and zooming. For example, in some interchangeable lenses, autofocusing is performed based on a drive force of a drive motor, and manual focusing is performed based on operation performed on a manual operation section (see JP-A-6-11636, for example).

In the imaging apparatus described in JP-A-6-11636, manual focusing is performed by manually rotating operation of a manual operation ring, and autofocusing and manual focusing are performed without any operation member for switching the focusing between the autofocusing and the manual focusing.

SUMMARY

In a lens drive unit, such as the one described above, when a transmission mechanism for the manual drive and a transmission mechanism for the automatic drive do not have appropriate respective reduction ratios, the number of gears increases and hence size reduction will not be achieved.

Further, when the number of gears increases, the total amount of backlash does not allow fine adjustment during operation, resulting in degradation in operability.

In related art, for example, in the configuration described in JP-A-6-11636, in which the automatic drive and the manual drive are performed without any switching operation section, however, sufficient size reduction or high operability is not provided because no appropriate reduction ratio in the automatic or manual drive is provided.

It is therefore desirable to provide a lens drive unit and an imaging apparatus capable of size reduction and operability improvement.

First, an embodiment of the present technology is directed to a lens drive unit including a driven member that moves a lens in an optical axis direction, a first gear rotated by a drive force of a drive motor, a second gear rotated by a drive force of a manual operation section, a third gear that engages with the first gear and the second gear and is rotated when the first gear is rotated but the second gear is not rotated whereas rotated when the second gear is rotated but the first gear is not rotated, and a fourth gear rotated when the third gear is rotated to transmit the drive force of the drive motor or the drive force of the manual operation section to the driven member, and the reduction ratio of the fourth gear to the first gear is set to be greater than the reduction ratio of the fourth gear to the second gear.

The thus configured lens drive unit having a small number of gears provides appropriate reduction ratios.

Second, in the lens drive unit described above, it is preferable that a sun gear is used as the first gear, that an internal gear coaxial with the first gear is used as the second gear, that a planetary gear that rotates on an axis thereof and revolves around the first gear is used as the third gear, and that a planetary carrier is used as the fourth gear.

Using a sun gear as the first gear, an internal gear coaxial with the first gear as the second gear, a planetary gear that rotates on an axis thereof and revolves around the first gear as the third gear, and a planetary carrier as the fourth gear allows a mechanism that provides desired reduction ratios to be readily configured.

Third, in the lens drive unit described above, it is preferable that the reduction ratio of the fourth gear to the first gear is set to be greater than twice the reduction ratio of the fourth gear to the second gear.

When the reduction ratio of the fourth gear to the first gear is set to be greater than twice the reduction ratio of the fourth gear to the second gear, the reduction ratio of the driven member to the drive motor can be sufficiently large.

Fourth, in the lens drive unit described above, it is preferable that each of the first gear, the second gear, the third gear, and the fourth gear is a spur gear.

When each of the first gear, the second gear, the third gear, and the fourth gear is a spur gear, the space occupied by each of the gears is reduced.

Fifth, in the lens drive unit described above, it is preferable that a DC motor is used as the drive motor.

Using a DC motor as the drive motor allows a high-output motor to be used as the drive motor.

Sixth, in the lens drive unit described above, it is preferable that the driven member is rotated when the fourth gear is rotated, that the manual operation section is operated to rotate, that the reduction ratio of the driven member to the drive motor is set at 300 or greater, and that the reduction ratio of the driven member to the manual operation section is set at 2 or greater.

When the driven member is rotated as the fourth gear is rotated, the manual operation section is operated to rotate, the reduction ratio of the driven member to the drive motor is set at 300 or greater, and the reduction ratio of the driven member to the manual operation section is set at 2 or greater, an optimum reduction ratio is provided in each of the system that transmits the drive force of the drive motor and the system that transmits the drive force of the manual operation section.

Seventh, in the lens drive unit described above, it is preferable that the manual operation section is operated to rotate, and that the manual operation section is configured to be rotatable by an angle greater than or equal to 90° but smaller than or equal to 120°.

The manual operation section, which is operated to rotate and configured to be rotatable by an angle greater than or equal to 90° but smaller than or equal to 120°, has an appropriate rotary angle.

Another embodiment of the present technology is directed to an imaging apparatus including a lens drive unit that drives a lens and an imaging device that converts an optical image captured through the lens into an electric signal, the lens drive unit including a driven member that moves the lens in an optical axis direction, a first gear rotated by a drive force of a drive motor, a second gear rotated by a drive force of a manual operation section, a third gear that engages with the first gear and the second gear and is rotated when the first gear is rotated but the second gear is not rotated whereas rotated when the second gear is rotated but the first gear is not rotated, and a fourth gear rotated when the third gear is rotated to transmit the drive force of the drive motor or the drive force of the manual operation section to the driven member, and the reduction ratio of the fourth gear to the first gear is set to be greater than the reduction ratio of the fourth gear to the second gear.

In the thus configured imaging apparatus, the lens drive unit having a small number of gears provides appropriate reduction ratios.

The lens drive unit according to the embodiment of the present technology includes a driven member that moves a lens in an optical axis direction, a first gear rotated by a drive force of a drive motor, a second gear rotated by a drive force of a manual operation section, a third gear that engages with the first gear and the second gear and is rotated when the first gear is rotated but the second gear is not rotated whereas rotated when the second gear is rotated but the first gear is not rotated, and a fourth gear rotated when the third gear is rotated to transmit the drive force of the drive motor or the drive force of the manual operation section to the driven member, and the reduction ratio of the fourth gear to the first gear is set to be greater than the reduction ratio of the fourth gear to the second gear.

An appropriate reduction ratio is therefore provided by using a small number of gears in each of the system that transmits the drive force of the drive motor and the system that transmits the drive force of the manual operation section, whereby size reduction and operability improvement are achieved.

In a preferred embodiment of the present technology, a sun gear is used as the first gear; an internal gear coaxial with the first gear is used as the second gear; a planetary gear that rotates on an axis thereof and revolves around the first gear is used as the third gear; and a planetary carrier is used as the fourth gear.

Using the thus configured planetary gear mechanism allows a mechanism that provides desired reduction ratios to be readily configured, whereby a desired reduction ratio in each transmission path can be provided based on a simple configuration.

In a preferred embodiment of the present technology, the reduction ratio of the fourth gear to the first gear is set to be greater than twice the reduction ratio of the fourth gear to the second gear.

The reduction ratio of the driven member to the drive motor can therefore be sufficiently large, whereby the speed, output, and efficiency of the drive motor can be increased.

In a preferred embodiment of the present technology, each of the first gear, the second gear, the third gear, and the fourth gear is a spur gear.

The space occupied by each of the gears is therefore reduced, contributing to size reduction and simplification of the structure.

In a preferred embodiment of the present technology, a DC motor is used as the drive motor.

A high-output motor can therefore be used as the drive motor, whereby the speed, output, and efficiency of the drive motor can be increased.

In a preferred embodiment of the present technology, the driven member is rotated when the fourth gear is rotated, the manual operation section is operated to rotate, the reduction ratio of the driven member to the drive motor is set at 300 or greater, and the reduction ratio of the driven member to the manual operation section is set at 2 or greater.

Setting the reduction ratios as described above not only ensures an optimum reduction ratio in the system that transmits the drive force of the drive motor and the system that transmits the drive force of the manual operation section and hence increases the speed, output, and efficiency of the drive motor but also reduces the size of the lens drive unit.

In a preferred embodiment of the present technology, the manual operation section is operated to rotate, and the manual operation section is configured to be rotatable by an angle greater than or equal to 90° but smaller than or equal to 120°.

Setting the rotary angle of the manual operation section as described above not only provides a satisfactory operability of the manual operation section because the rotary angle is not too large but also allows the lens to be readily stopped in a desired position because the rotary angle is not too small and hence precision in lens position to be improved.

The imaging apparatus according to the embodiment of the present technology includes the lens drive unit that drives a lens and an imaging device that converts an optical image captured through the lens into an electric signal, the lens drive unit including the driven member that moves the lens in an optical axis direction, the first gear rotated by a drive force of a drive motor, the second gear rotated by a drive force of a manual operation section, the third gear that engages with the first gear and the second gear and is rotated when the first gear is rotated but the second gear is not rotated whereas rotated when the second gear is rotated but the first gear is not rotated, and the fourth gear rotated when the third gear is rotated to transmit the drive force of the drive motor or the drive force of the manual operation section to the driven member, and the reduction ratio of the fourth gear to the first gear is set to be greater than the reduction ratio of the fourth gear to the second gear.

An appropriate reduction ratio is therefore provided by using a small number of gears in each of the system that transmits the drive force of the drive motor and the system that transmits the drive force of the manual operation section, whereby size reduction and operability improvement are achieved.

DETAILED DESCRIPTION

Embodiments of the present technology will be described below with reference to the accompanying drawings.

In the embodiments described below, an imaging apparatus according to the present technology is applied to a still camera, and a lens drive unit according to the present technology is applied to a lens drive unit provided in an interchangeable lens for the still camera.

It is noted that the present technology is not necessarily applied to a still camera and a lens drive unit provided in an interchangeable lens for the still camera but is widely applicable, for example, to a variety of imaging apparatus incorporated in a video camcorder and other systems and a variety of lens drive units provided in the imaging apparatus.

In the following description, the front-rear, up-down, and right-left directions are defined relative to a user who uses a still camera to capture an image. That is, the subject side is the front side, and the image-capturing user side is the rear side.

The front-rear, up-down, and right-left directions used below are defined for convenience of description, and the directions defined as described above do not impose any limitation on implementation of the present technology.

[Configuration of Imaging Apparatus]

Figure 1:
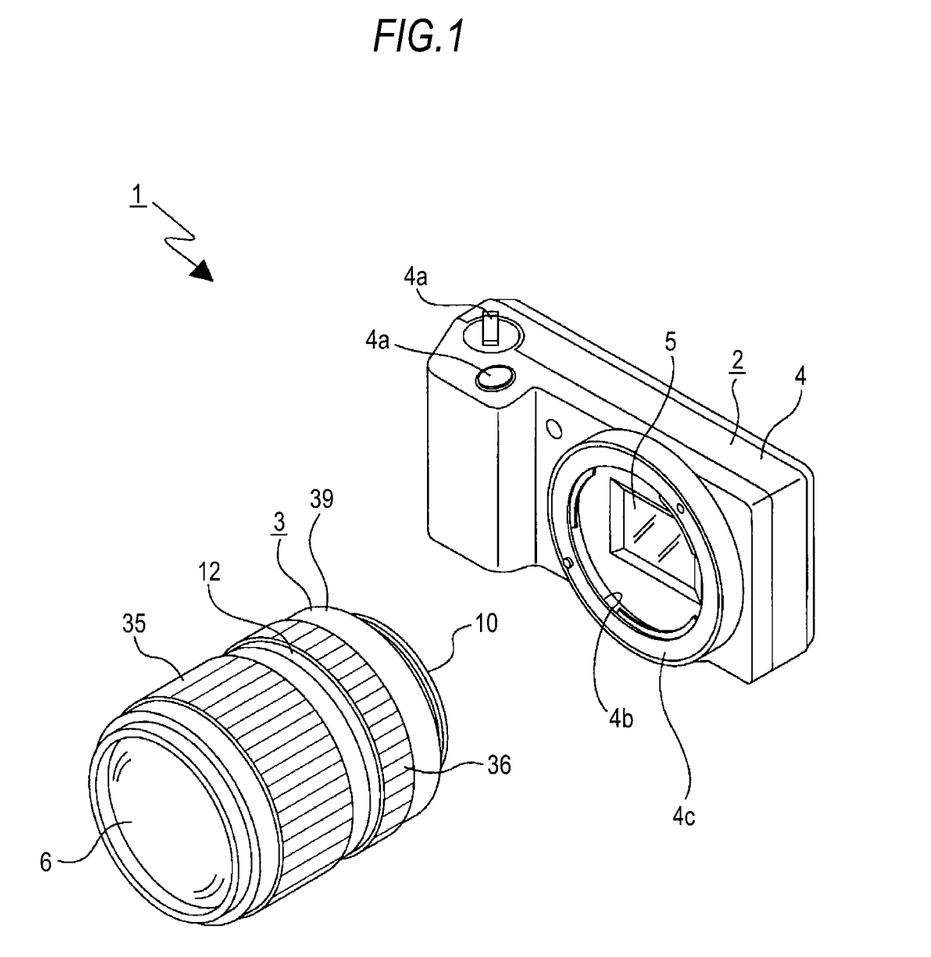
FIG. 1, along with FIGS. 2 to 10, shows an embodiment of the present technology and is a schematic perspective view of an imaging apparatus.

An imaging apparatus 1 is formed of an apparatus body 2 and an interchangeable lens 3, which is detachable from the apparatus body 2 (see FIG. 1).

The apparatus body 2 is formed of necessary portions disposed inside and outside an enclosure 4.

A variety of input operation portions 4a, 4a, . . . are disposed on the upper side of the enclosure 4. The input operation portions 4a, 4a, . . . include, for example, a power on/off button, a shutter button, and a mode switching knob.

A variety of other input operation portions and a display (not shown) are disposed on the rear side of the enclosure 4. The other input operation portions include, for example, a zoom switch and another mode switching knob.

A circular opening 4b is formed through the front surface of the enclosure 4, and a portion that surrounds the opening 4b is provided as a mount portion 4c, to which the interchangeable lens 3 is attached.

An imaging device 5, such as a CCD (charge coupled device) and a CMOS (complementary metal-oxide semiconductor) device, is disposed in the enclosure 4 and located behind the aperture 4b.

[Configuration of Interchangeable Lens]

The interchangeable lens 3 is, for example, an interchangeable lens for a digital single lens reflex camera.

Figure 2:
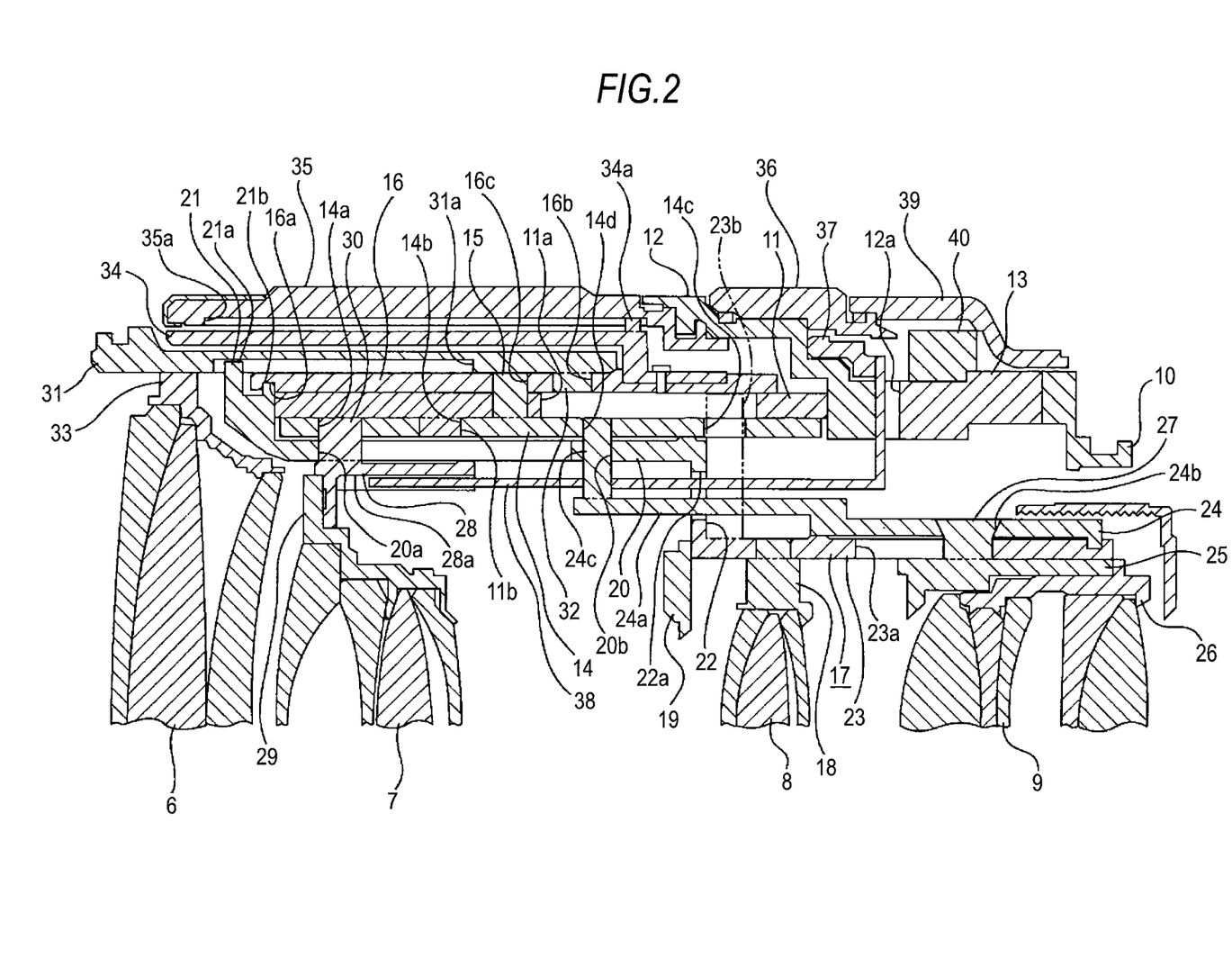
FIG. 2 is a schematic enlarged cross-sectional view showing part of an interior structure of an interchangeable lens.

The interchangeable lens 3, for example, includes a zoom optical system provided as a varifocal lens and having a four-group configuration formed of a first lens group 6, a second lens group 7, a third lens group 8, and a fourth lens group 9 sequentially arranged from the object side (front side) toward the image side (rear side) (see FIG. 2). In the interchangeable lens 3, the first lens group 6, the second lens group 7, the third lens group 8, and the fourth lens group 9 are moved in the optical axis direction to appropriate positions for zooming, and the second lens group 7 is moved in the optical axis direction for focusing.

A rear end portion of the interchangeable lens 3 forms a lens mount 10, which is connected in the form of bayonet connection to the mount portion 4c of the apparatus body 2.

The following components are arranged in the interchangeable lens 3 sequentially from the front side: a fixed ring 11; an intermediate tube 12; and a rear portion holding ring 13, each of which has a substantially tubular shape.

A third-group rectilinearly guiding groove 11a extending in the front-rear direction is formed in the fixed ring 11.

Fixed rollers 11b, 11b, 11b, which are set apart from each other in the circumferential direction, are attached to the fixed ring 11.

The intermediate tube 12, except an rear end portion thereof, is located on the outer circumference side of a rear end portion of the fixed ring 11, and the rear end portion of the intermediate tube 12 is fixed to the rear end portion of the fixed ring 11. An insertion hole 12a is formed in the rear end portion of the intermediate tube 12.

The front surface of the rear portion holding ring 13 is fixed to the rear surface of the intermediate tube 12. The lens mount 10 is fixed to the rear end of the rear portion holding ring 13.

The lens mount 10, the fixed ring 11, the intermediate tube 12, and the rear portion holding ring 13 described above function as a fixed integral portion and form a base portion of the interchangeable lens 3.

A zoom/focus cam ring 14 is disposed on the inner circumference side of the fixed ring 11. The zoom/focus cam ring 14 has the following cam grooves formed therein: second-group focus cam grooves 14a, 14a, 14a; cam grooves for movement 14b, 14b, 14b; and third-group cam grooves 14c, 14c, 14c, and the cam grooves in each of the three sets are set apart from each other in the circumferential direction (see FIGS. 2 and 3). An interlocking cam groove 14d is further formed in the zoom/focus cam ring 14. The interlocking cam groove 14d is inclined to the optical axis direction.

Figure 3:
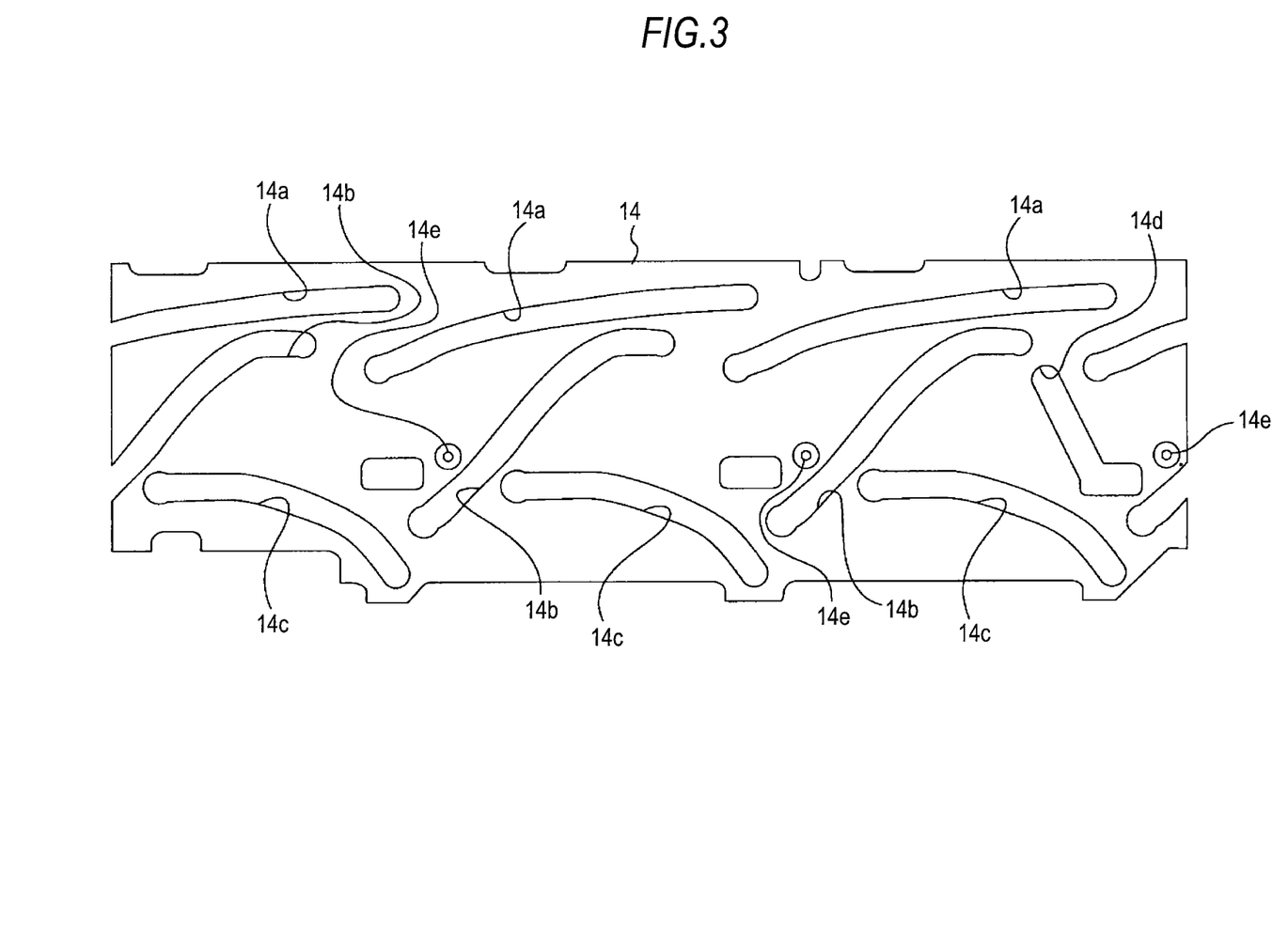
FIG. 3 is an enlarged development of a zoom/focus cam ring.

The fixed rollers 11b, 11b, 11b of the fixed ring 11 slidably engage with the cam grooves for movement 14b, 14b, 14b, respectively.

Connection roller attachment portions 14e, 14e, 14e, which are set apart from each other in the circumferential direction, are provided in the zoom/focus cam ring 14. Connection rollers 15, 15, 15 are attached to the connection roller attachment portions 14e, 14e, 14e, respectively.

Figure 4:
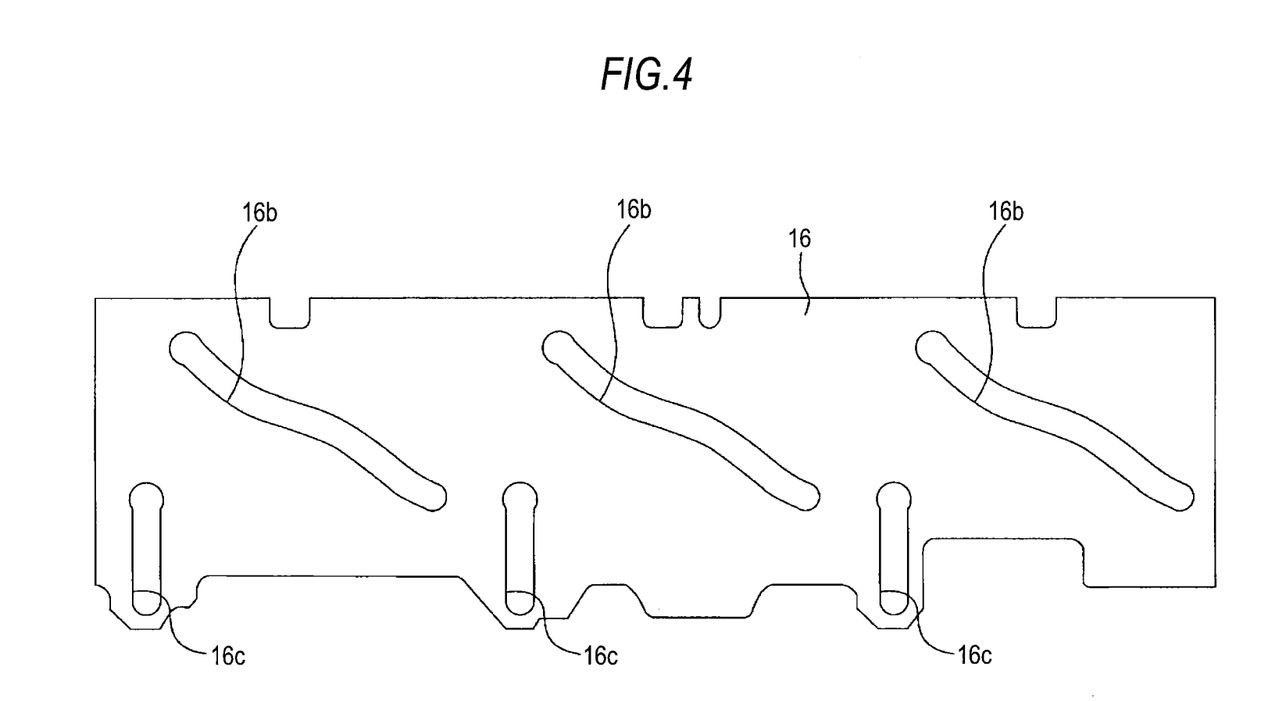
FIG. 4 is an enlarged development of a first-group cam ring.

A first-group cam ring 16 is disposed on the outer surface side of the fixed ring 11 (see FIGS. 2 and 4).

A bayonet groove 16a is formed in a front end portion of the first-group cam groove 16.

First-group cam grooves 16b, 16b, 16b and interlocking grooves 16c, 16c, 16c are formed in the first-group cam ring 16, and the grooves in each of the two sets are set apart from each other in the circumferential direction. The connection rollers 15, 15, 15, which are attached to the zoom/focus cam ring 14, slidably engage with the interlocking grooves 16c, 16c, 16c, respectively.

A third-group moving ring 17 is disposed on the inner surface side of the zoom/focus cam ring 14. A third-group lens holding frame 18, which holds the third lens group 8, is attached to the third-group moving ring 17.

A diaphragm unit 19 is attached to the third-group moving ring 17.

Figure 5:
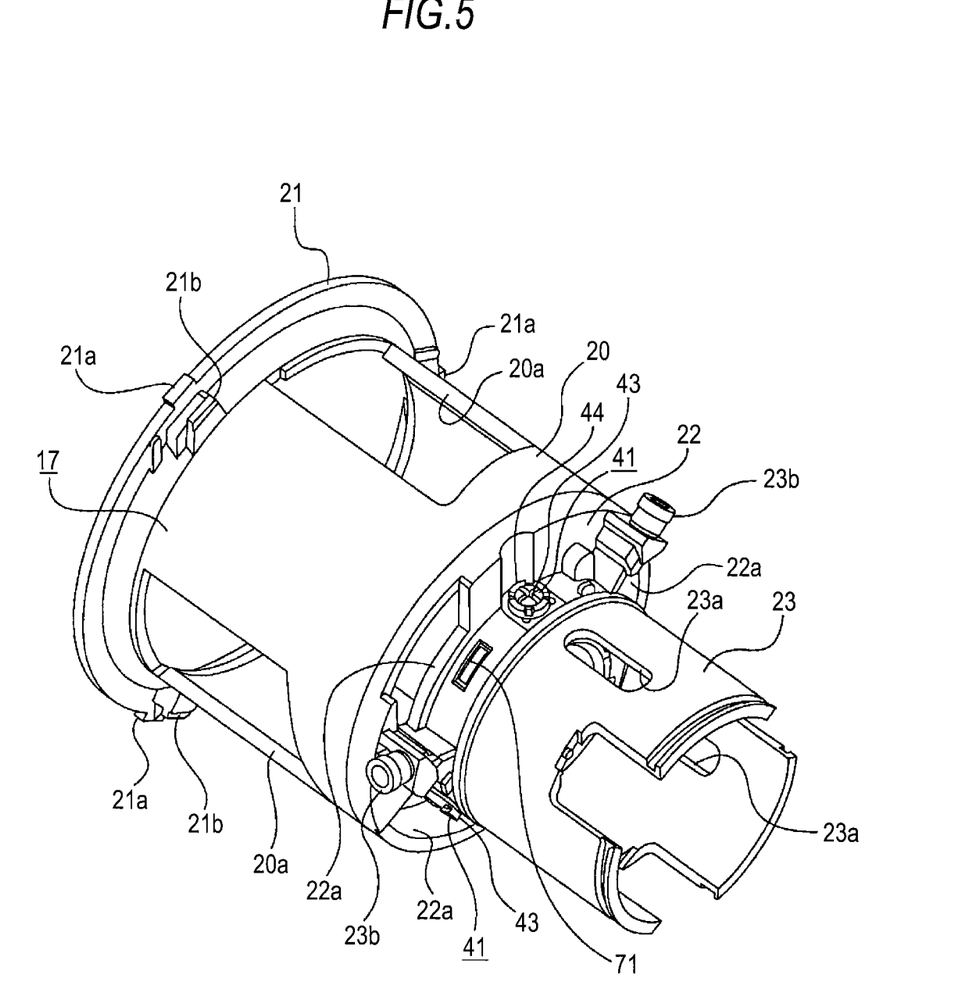
FIG. 5 is an enlarged perspective view of a third-group moving ring.

The third-group moving ring 17 is formed of a front-side tubular portion 20, a flange portion 21, which overhangs outward from an front end portion of the front-side tubular portion 20, a connection surface portion 22, which overhangs inward from an rear end portion of the front-side tubular portion 20, and a rear-side tubular portion 23, which protrudes rearward from an inner circumferential portion of the connection surface portion 22 (see FIGS. 2 and 5).

Communication holes 20a, 20a, 20a, which extend in the front-rear direction and are set apart from each other in the circumferential direction, are formed in the front-side tubular portion 20. A support hole 20b, which extends in the circumferential direction, is formed in a rear end portion of the front-side tubular portion 20.

First-group guide pieces 21a, 21a, 21a, which protrude outward and are set apart from each other in the circumferential direction, are provided on a front end portion of the flange portion 21. Bayonet tabs 21b, 21b, 21b, which protrude outward and are set apart from each other in the circumferential direction, are provided on a rear end portion of the flange portion 21. The bayonet tabs 21b, 21b, 21b slidably engage with the bayonet groove 16a in the first-group cam ring 16.

Insertion holes 22a, 22a, 22a, which are set apart from each other in the circumferential direction, are formed through the connection surface portion 22.

Rectilinear guide grooves 23a, 23a, 23a, which extend in the front-rear direction and set apart from each other in the circumferential direction, are formed in the rear-side tubular portion 23. Third-group rollers 23b, 23b, 23b, which are set apart from each other in the circumferential direction, are provided on a front end portion of the rear-side tubular portion 23. The third-group rollers 23b, 23b, 23b slidably engage with the third-group rectilinear guide grooves 11a, 11a, 11a in the fixed ring 11 and the third-group cam grooves 14c, 14c, 14c in the zoom/focus cam ring 14, respectively.

A fourth-group cam ring 24 is connected in the form of bayonet connection to the third-group moving ring 17. A substantially front half of the fourth-group cam ring 24 forms a protruding portion 24a. The protruding portion 24a is inserted in the forward direction into one of the insertion holes 22a, 22a, 22a in the third-group moving ring 17, and the portion other than the protruding portion 24a is disposed on the outer surface side of the third-group moving ring 17.

Tapered cam grooves 24b, 24b, 24b, which are set apart from each other in the circumferential direction, are formed in the fourth-group cam ring 24 in positions shifted toward to the rear end thereof.

A fourth-group roller 24c is attached to a front end portion of the protruding portion 24a of the fourth-group cam ring 24c. The fourth-group roller 24c, which is inserted into the support hole 20b formed in the front-side tubular portion 20 of the third-group moving ring 17, slidably engages with the interlocking cam groove 14d in the zoom/focus cam ring 14.

The third-group moving ring 17, which functions as an attachment member, is therefore supported by the zoom/focus cam ring 14, which functions as a support member that supports the third-group moving ring 17.

The fourth-group cam ring 24 is fixed in the optical axis direction but rotated relative to the third-group moving ring 17 in response to zooming action, which will be described later.

A fourth-group moving ring 25 is disposed on the inner surface side of the rear-side tubular portion 23 of the third-group moving ring 17 (see FIG. 2). A fourth-group lens holding frame 26, which holds the fourth lens group 9, is attached to the fourth-group moving ring 25.

Tapered cam followers 27, 27, 27, which are set apart from each other in the circumferential direction, are attached to the fourth-group moving ring 25. The tapered cam followers 27, 27, 27 slidably engage with the tapered cam grooves 24b, 24b, 24b and the rectilinear guide grooves 23a, 23a, 23a, respectively. The fourth-group moving ring 25 is therefore moved in the optical axis direction relative to the third-group moving ring 17.

A second-group moving ring 28 is disposed on the inner surface side of the front-side tubular portion 20 of the third-group moving ring 17, and a second-group lens holding frame 29, which holds the second lens group 7, is attached to the second-group moving ring 28.

A focus interlocking groove 28a, which extends in the front-rear direction, is formed in the second-group moving ring 28. Second-group rollers 30, 30, 30, which are set apart from each other in the circumferential direction, are attached to the second-group moving ring 28. The second-group rollers 30, 30, 30, which are inserted into the communication holes 20a, 20a, 20a formed in the front-side tubular portion 20 of the third-group moving ring 17, slidably engage with the second-group focus cam grooves 14a, 14a, 14a in the zoom/focus cam ring 14, respectively.

A first-group moving ring 31 is disposed on the outer surface side of the first-group cam ring 16. First-group rectilinear guide grooves 31a, 31a, 31a, which extend in the front-rear direction and set apart from each other in the circumferential direction, are formed in the inner surface of the first-group moving ring 31. The first-group guide pieces 21a, 21a, 21a, which are provided on the flange portion 21 of the third-group moving ring 17, slidably engage with the first-group rectilinear guide grooves 31a, 31a, 31a, respectively.

First-group cam followers 32, 32, 32, which are set apart from each other in the circumferential direction, are attached to the first-group moving ring 31 in positions shifted toward the rear end thereof. The first-group cam followers 32, 32, 32 slidably engage with the first-group cam grooves 16b, 16b, 16b in the first-group cam ring 16, respectively.

A first-group lens holding frame 33, which holds the first lens group 6, is attached to a front end portion of the first-group moving ring 31.

A first-group light shielding ring 34 is attached to the outer surface of the first-group moving ring 31. The first-group light shielding ring 34 is fixed to the first-group cam ring 16. A zoom interlocking pin 34a is attached to the first-group light shielding ring 34.

A zoom operation ring 35 is disposed on the outer surface side of the first-group light shielding ring 34 and rotatably supported by the intermediate tube 12. A pin rectilinearly guiding groove 35a, which extend in the front-rear direction, is formed in the zoom operation ring 35, and the zoom interlocking pin 34a slidably engages with the pin rectilinearly guiding groove 35a.

A focus operation ring 36, which functions as a manual operation section, is rotatably supported by the outer surface of the intermediate tube 12. A drive gear portion 36a is formed along the inner surface of a rear end portion of the focus operation ring 36 (see FIGS. 2 and 6). A substantially annular focus interlocking ring 37 is rotatably disposed on the inner surface side of the focus operation ring 36 and in front of the drive gear portion 36a. A transmission gear portion 37a is formed in part of the inner circumferential surface of the focus interlocking ring 37 (see FIG. 7).

Figure 6:
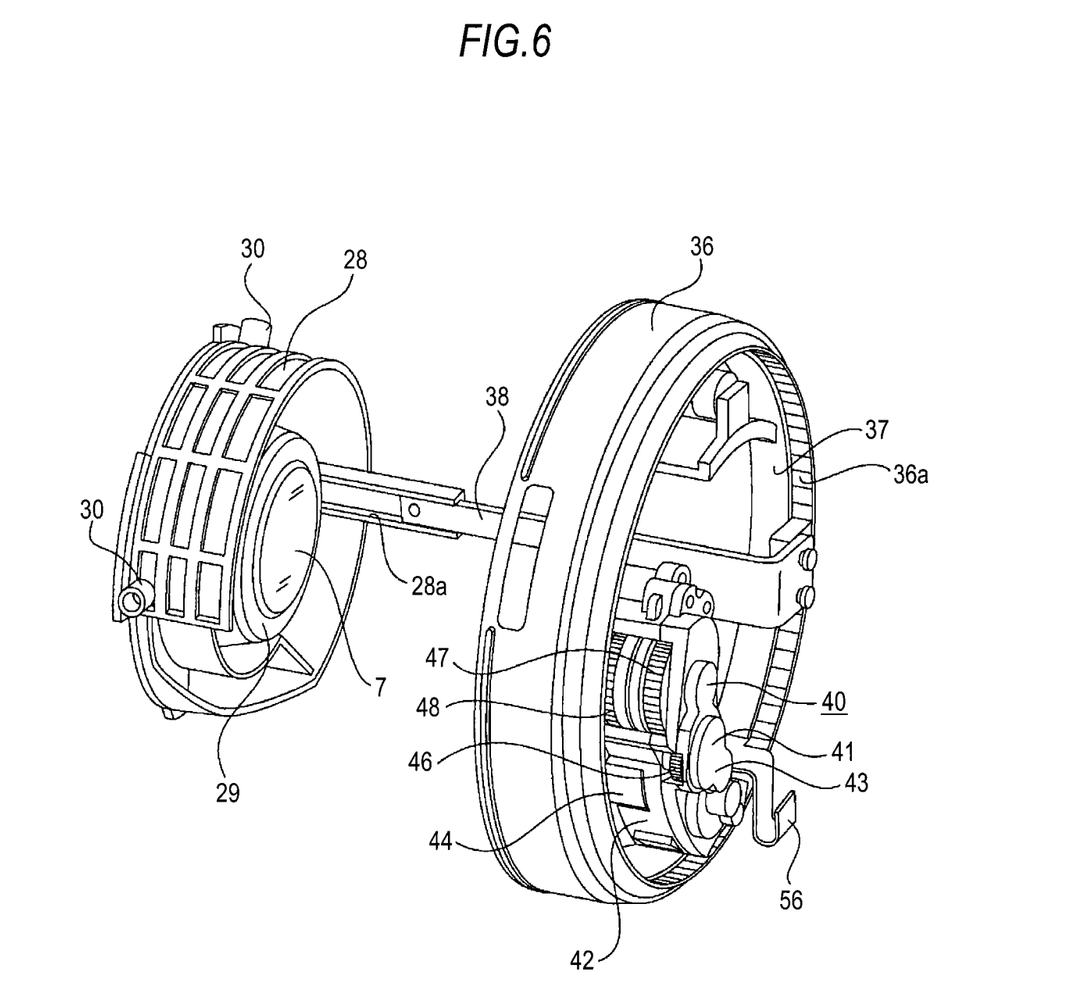
FIG. 6 is an enlarged perspective view showing a second-group lens holding frame, a focus operation ring, a lens drive unit, and other components.

A focus interlocking lever 38, which extends in the front-rear direction except a rear end portion thereof, is attached to the focus interlocking ring 37, inserted into the insertion hole 12a in the intermediate tube 12, and slidably engages in the front-rear direction with the focus interlocking groove 28a in the second-group moving ring 28 (see FIGS. 2 and 6).

The focus interlocking lever 38 is attached to the focus interlocking ring 37 and rotated when the focus interlocking ring 37 is rotated.

A rear-portion exterior decoration ring 39 is disposed on the rear end side of the focus operation ring 36, and a main substrate (not shown) on which an electric control circuit that controls the interchangeable lens 3 is formed is disposed in the space surrounded by the rear-portion exterior decoration ring 39.

Figure 7:
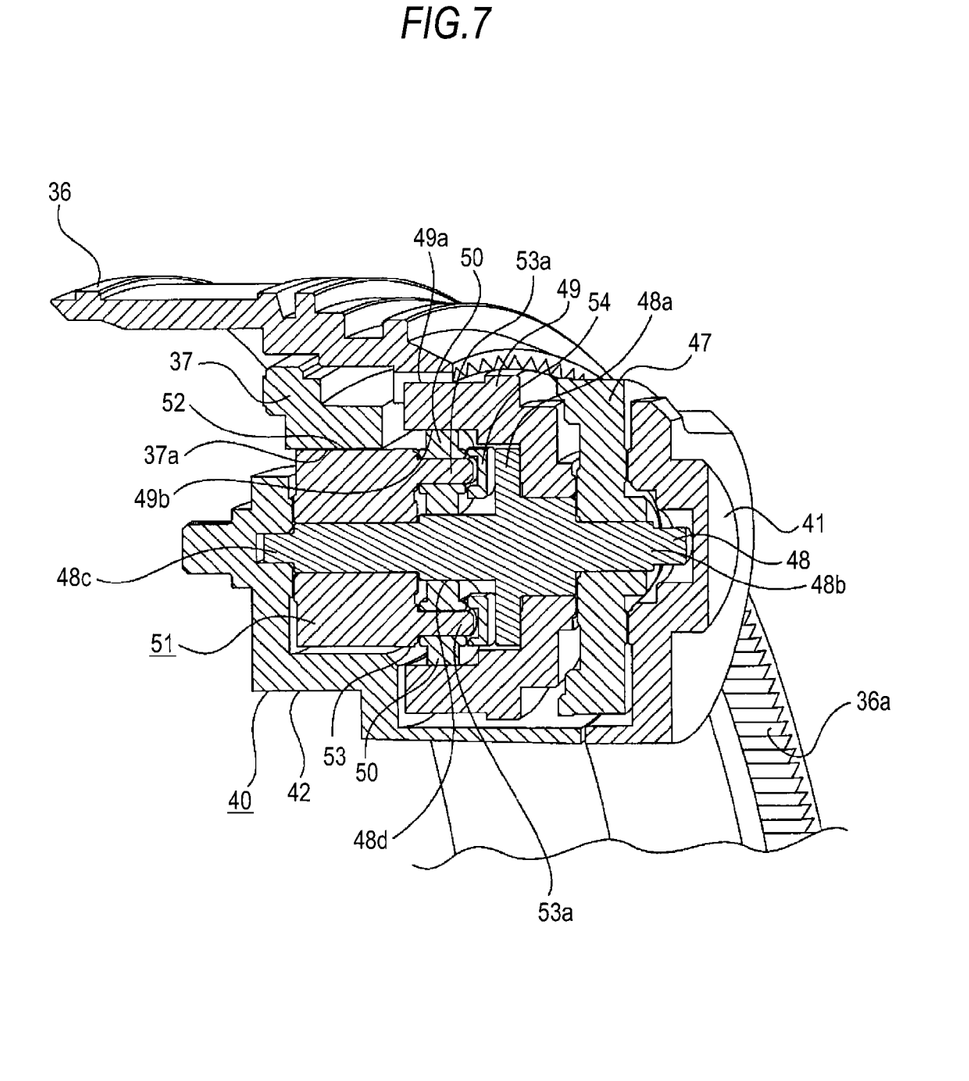
FIG. 7 is an enlarged cross-sectional view showing a gear unit and other components.

A gear unit 40 for focus drive is disposed in an upper end portion in the space surrounded by the rear-portion exterior decoration ring 39 (see FIGS. 2, 6, and 7).

[Specific Configuration of Gear Unit]

The gear unit 40 is formed in such a way that necessary portions are attached to or supported by a gear case 41 (see FIGS. 6 to 9). The gear case 41 is formed of a case portion 42 and a lid portion 43 bonded to each other.

Figure 8:
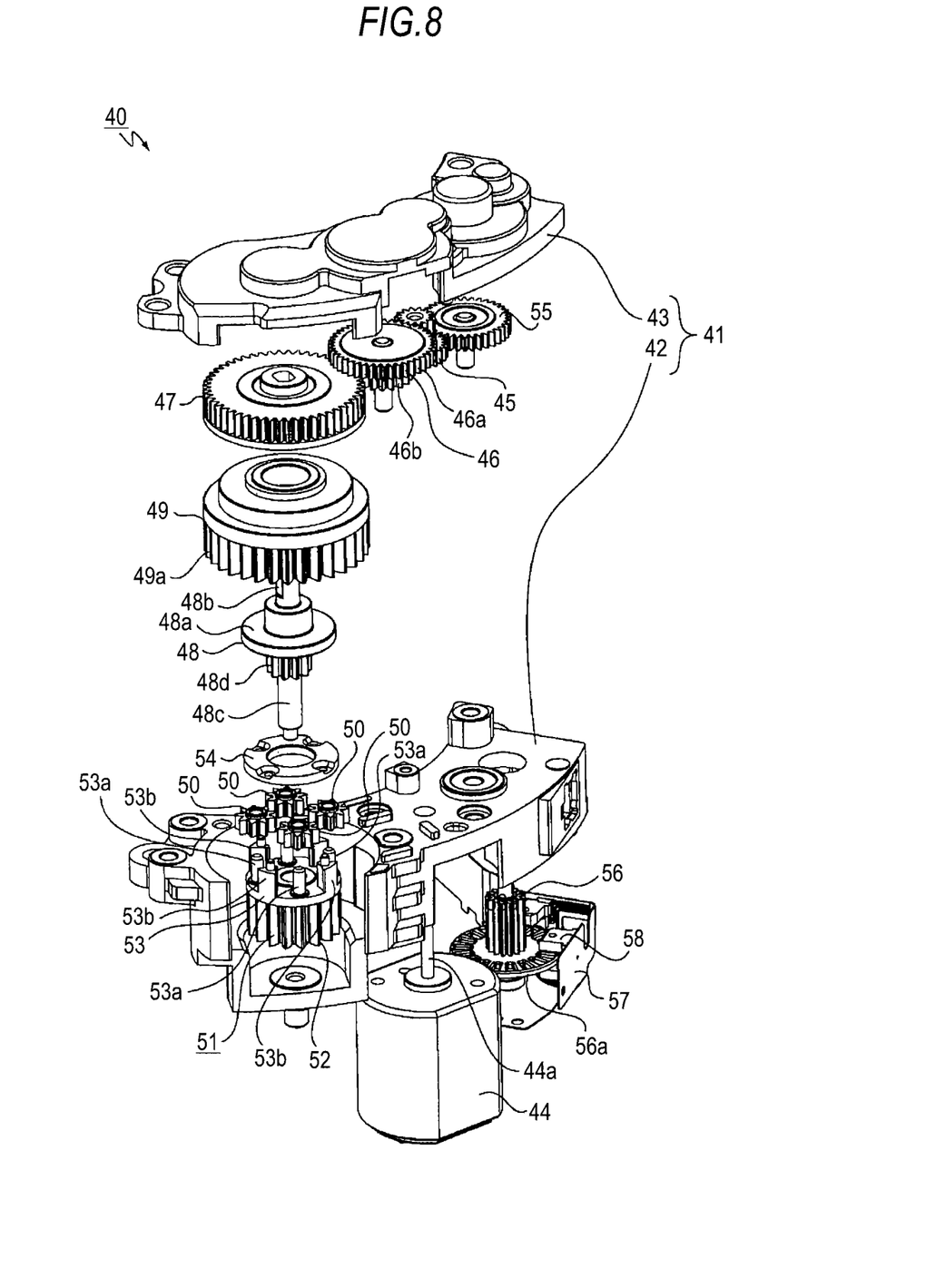
FIG. 8 is an enlarged exploded perspective view of the gear unit.

A drive motor 44 is attached to the case portion 42. The drive motor 44 is, for example, a DC motor.

A drive gear 45 is attached to a motor shaft 44a of the drive motor 44, and the drive gear 45 engages with a two-step gear 46. The two-step gear 46 includes a large-diameter gear portion 46a, which engages with the drive gear 45.

The two-step gear 46 further includes a small-diameter gear portion 46b, which engages with a transmission gear 47.

The transmission gear 47 engages with a sun gear that functions as a first gear 48. The first gear 48 is formed of a slidable portion 48a, which has a circular-plate-shaped flange portion, an attachment shaft portion 48b, which protrudes from the slidable portion 48a in one direction, a support shaft portion 48c, which protrudes from the slidable portion 48a in the other direction, and a gear portion 48d, which is provided around an end portion of the support shaft portion 48c in a position shifted toward the slidable portion 48a. The first gear 48, the attachment shaft portion 48b of which is attached to the transmission gear 47, is rotated integrally with the transmission gear 47.

An internal gear that functions as a second gear 49 is rotatably supported by the first gear 48. The second gear 49 has an outer-circumferential-side gear portion 49a and an inner-circumferential-side gear portion 49b. The outer-circumferential-side gear portion 49a of the second gear 49 engages with the drive gear portion 36a of the focus operation ring 36. The second gear 49 is therefore rotated when the focus operation ring 36 is rotated.

The transmission gear 47, the first gear 48, and the second gear 49 are coaxially arranged, and part of the slidable portion 48a of the first gear 48 is inserted into a central portion of the second gear 49.

The transmission gear 47 and the first gear 48 are rotatable as an integral part relative to the second gear 47, whereas the second gear 49 is rotatable relative to the transmission gear 47 and the first gear 48.

The gear portion 48d of the first gear 48 and the inner-circumferential-side gear portion 49b of the second gear 49 engage with planetary gears that function as third gears 50, 50, . . . , which are set apart from each other in the circumferential direction.

The third gears 50, 50, . . . are rotatably supported by a planetary carrier that functions as a fourth gear 51. The fourth gear 51 is formed of a feed gear portion 52 and a gear support portion 53. The gear support portion 53 is provided with gear support shafts 53a, 53a, . . . , which are set apart from each other in the circumferential direction. Attachment protruding portions 53b, 53b, . . . are provided on the gear supporting portion 53 in positions between the gear support shafts 53a, 53a, . . . .

The third gears 50, 50, . . . are rotatably supported by the gear support shafts 53a, 53a, . . . , and an annular pressing member 54 is attached to front end portions of the attachment protruding portions 53b, 53b, . . . . The pressing member 54 therefore prevents the third gears 50, 50, . . . from disengaging from the gear support shafts 53a, 53a, . . . .

Part of the feed gear portion 52 of the fourth gear 51 protrudes from the case portion 42, and the feed gear portion 52 engages with the transmission gear portion 37a of the focus interlocking ring 37. The focus interlocking ring 37 is therefore rotated when the fourth gear 51 is rotated and functions as a driven member that is rotated (driven) when a rotary force (drive force) of the fourth gear 51 is transmitted to the focus interlocking ring 37.

The support shaft portion 48c of the first gear 48 is inserted into the feed gear portion 52 of the fourth gear 51, whereby the first gear 48 is rotatable relative to the fourth gear 51 whereas the fourth gear 51 is rotatable relative to the first gear 48.

An intermediate gear 55, which is located on the opposite side of the drive gear 45 to the two-step gear 46, engages with the drive gear 45, and a sensor gear 56 engages with the intermediate gear 55. The sensor gear 56 is provided with a detected portion 56a having a plurality of detected holes set apart from each other in the circumferential direction.

A flexible printed wiring board 57 is attached to the gear case 41, and a sensor 58 is mounted on an end portion of the flexible printed wiring board 57. The sensor 58 is so located that it sandwiches the detected portion 56a of the sensor gear 56.

Figure 9:
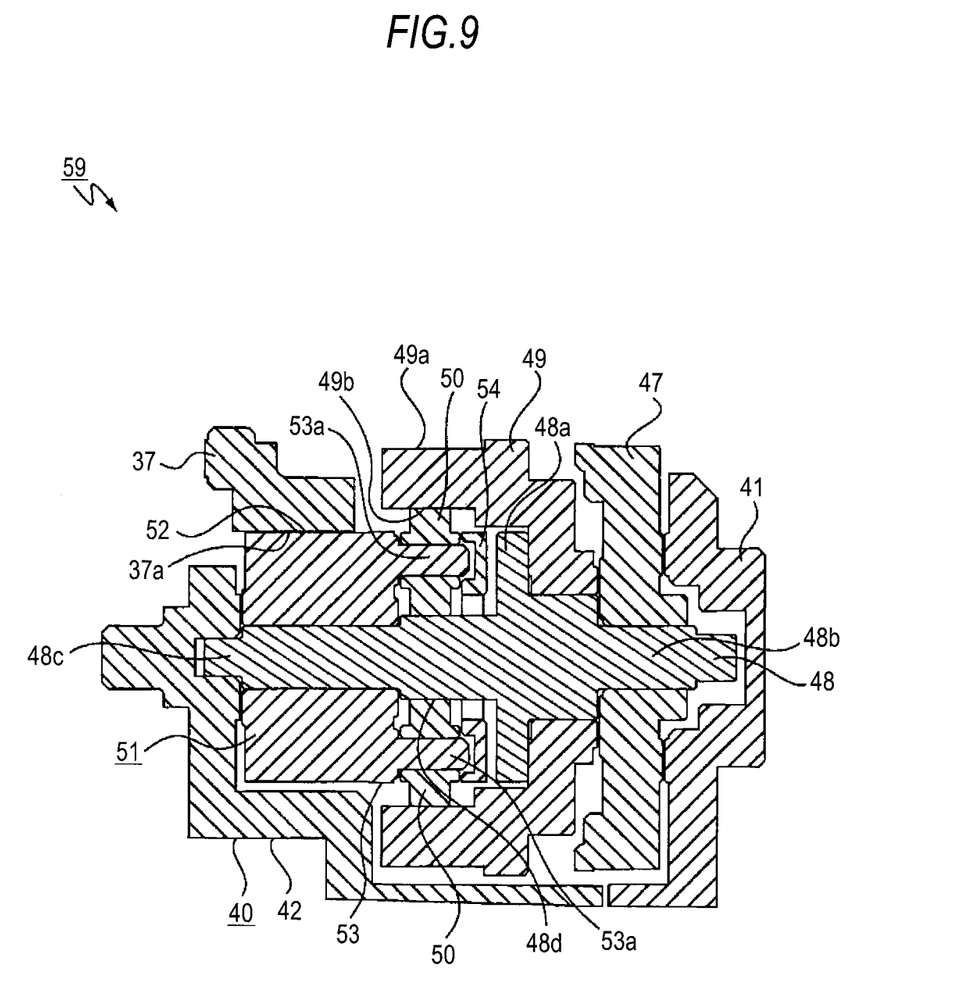
FIG. 9 is an enlarged cross-sectional view of a lens drive unit.

The gears supported by the gear case 41 along with the focus interlocking ring 37 form a lens drive unit 59, which moves the second lens group 7 in the optical axis direction for focusing action.

Each of the gear portion 48d of the first gear 48, the second gear 49, the third gears 50, 50, . . . , and the feed gear portion 52 of the fourth gear 51 is a spur gear.

[Zooming Action in Interchangeable Lens]

Zooming action in the interchangeable lens 3 will next be described.

When the zoom operation ring 35 is operated to rotate, a rotary drive force is transmitted to the zoom interlocking pin 34a, which engages with the pin rectilinearly guiding groove 35a. When the rotary drive force is transmitted to the zoom interlocking pin 34a, the first-group light shielding ring 34 and the first-group cam ring 16 are integrally rotated.

When the first-group cam ring 16 is rotated, the zoom/focus cam ring 14 is rotated in response to the rotation of the first-group cam ring 16 because the connection rollers 15, 15, 15 attached to the zoom/focus cam ring 14 engage with the interlocking grooves 16c, 16c, 16c in the first-group cam ring 16.

Since the cam grooves for movement 14b, 14b, 14b engage with the fixed rollers 11b, 11b, 11b attached to the fixed ring 11 respectively, the zoom/focus cam ring 14 is guided, while rotating, by the fixed rollers 11b, 11b, 11b and moved in the optical axis direction.

The third-group rollers 23b, 23b, 23b attached to the third-group moving ring 17 engage with the third-group rectilinear guide grooves 11a, 11a, 11a in the fixed ring 11 and the third-group cam grooves 14c, 14c, 14c in the zoom/focus cam ring 14. The third-group moving ring 17 is therefore guided by the third-group rectilinear guide grooves 11a, 11a, 11a and moved in the optical axis direction, and the third-group lens holding frame 18 and the third lens group 8 are moved in the optical axis direction in response to the movement of the third-group moving ring 17.

The fourth-group cam ring 24, the fourth-group roller 24c of which engages with the interlocking cam groove 14d in the zoom/focus cam ring 14, is fixed in the optical axis direction but is rotated relative to the third-group moving ring 17.

Since the tapered cam followers 27, 27, 27 engage with the tapered cam grooves 24*b*, 24*b*, 24*b* in the fourth-group cam ring 24 and the rectilinear guide grooves 23*a*, 23*a*, 23*a* in the third-group moving ring 23, the fourth-group moving ring 25 is guided by the rectilinear guide grooves 23*a*, 23*a*, 23*a* and moved in the optical axis direction when the fourth-group cam ring 24 is rotated. The fourth-group lens holding frame 26 and the fourth lens group 9 are therefore moved in the optical axis direction in response to the movement of the fourth-group moving ring 25.

Since the bayonet tabs 21*b*, 21*b*, 21*b* of the third-group moving ring 17 engage with the bayonet groove 16*a*, the first-group cam ring 16 is rotated and moved in the optical axis direction integrally with the third-group moving ring 17 when the zoom operation ring 35 is rotated.

The first-group moving ring 31 is so restricted that it is rectilinearly moved because the first-group guide pieces 21*a*, 21*a*, 21*a* of the third-group moving ring 17 engage with the first-group rectilinear guide grooves 31*a*, 31*a*, 31*a* respectively, and the first-group cam followers 32, 32, 32 engage with the first-group cam grooves 16*b*, 16*b*, 16*b* in the first-group cam ring 16 respectively. As a result, the first-group moving ring 31 is guided by the first-group guide pieces 21*a*, 21*a*, 21*a* and moved in the optical axis direction in response to the action of the first-group cam ring 16, and the first-group lens holding frame 33 and the first lens group 6 are moved in the optical axis direction in response to the movement of the first-group moving ring 31.

The second-group moving ring 28 is so restricted that it is rectilinearly moved by the focus interlocking lever 38 that remains stationary, and the second-group rollers 30, 30, 30 engage with the second-group focus cam grooves 14*a*, 14*a*, 14*a* respectively. As a result, the second-group moving ring 28 is guided by the focus interlocking lever 38 and moved in the optical axis direction when the zoom/focus cam ring 14 is rotated, and the second-group lens holding frame 29 and the second lens group 7 are moved in the optical axis direction in response to the movement of the second-group moving ring 28.

[Focusing Action in Interchangeable Lens]

Focusing action in the interchangeable lens 3 will next be described.

Autofocusing action is performed when the drive motor 44 in the gear unit 40 is driven.

When the drive motor 44 is driven, the drive force of the drive motor 44 is sequentially transmitted to the drive gear 45, the two-step gear 46, the transmission gear 47, the first gear 48, the third gears 50, 50, . . . , and the fourth gear 51. In this process, the second gear 49 is not rotated because the focus operation ring 36 remains stationary, and the first gear 48 is rotated relative to the second gear 49.

Further, each of the third gears 50, 50, 50, . . . is rotated (on its axis) and caused to revolve around the first gear 48.

When the fourth gear 51 is rotated, the focus interlocking ring 37, which engages with the feed gear portion 52, is rotated, and the focus interlocking lever 38 is rotated in response to the rotation of the focus interlocking ring 37. When the focus interlocking lever 38 is rotated, the second-group moving ring 28, which engages with the focus interlocking lever 38, is rotated, and the second-group rollers 30, 30, 30 slide along the second-group focus cam grooves 14*a*, 14*a*, 14*a* in the zoom/focus cam ring 14, respectively. When the second-group rollers 30, 30, 30 slide along the second-group focus cam grooves 14*a*, 14*a*, 14*a* respectively, the second-group moving ring 28, the second-group lens holding frame 29, and the second lens group 7 are integrally moved in the optical axis direction for focusing (autofocusing).

In the autofocusing action, the sensor gear 56 is rotated via the intermediate gear 55 when the drive motor 44 is driven, and the sensor 58 detects the rotary position of the detected portion 56*a*. The position of the second lens group 7 in the optical axis direction is therefore detected in accordance with the rotary position of the detected portion 56*a*.

On the other hand, the manual focusing action is performed when the focus operation ring 36 is manually operated to rotate.

When the focus operation ring 36 is rotated, the rotary force of the focus operation ring 36 is sequentially transmitted to the second gear 49, the third gears 50, 50, . . . , and the fourth gear 51. In this process, the first gear 48 is not rotated because the drive motor 44 is not driven, and the second gear 49 is rotated relative to the first gear 48.

Further, each of the third gears 50, 50, 50, . . . is rotated (on its axis) and caused to revolve around the first gear 48.

When the fourth gear 51 is rotated, the focus interlocking ring 37, which engages with the feed gear portion 52, is rotated, and the focus interlocking lever 38 is rotated in response to the rotation of the focus interlocking ring 37. When the focus interlocking lever 38 is rotated, the second-group moving ring 28, which engages with the focus interlocking lever 38, is rotated, and the second-group rollers 30, 30, 30 slide along the second-group focus cam grooves 14*a*, 14*a*, 14*a* in the zoom/focus cam ring 14, respectively. When the second-group rollers 30, 30, 30 slide along the second-group focus cam grooves 14*a*, 14*a*, 14*a* respectively, the second-group moving ring 28, the second-group lens holding frame 29, and the second lens group 7 are integrally moved in the optical axis direction for focusing (manual focusing).

It is noted that the focus operation ring 36, which functions as a manual operation section, is configured to be rotatable by an angle ranging, for example, from greater than or equal to 90° but smaller than or equal to 120°.

Setting the angle by which the focus operation ring 36 is rotatable to be greater than or equal to 90° but smaller than or equal to 120° not only provides a satisfactory operability of the focus operation ring 36 because the rotary angle is not too large but also allows the second lens group 7 to be readily stopped in a desired position because the rotary angle is not too small and hence precision in focus adjustment to be improved.

In the interchangeable lens 3, the autofocusing action and the manual focusing action are performed as described above, and the reduction ratio of the fourth gear 51 to the first gear 48, which are rotated in the autofocusing action, is set to be greater than the reduction ratio of the fourth gear 51 to the second gear 49, which are rotated in the manual focusing action.

For example, the reduction ratio of the fourth gear 51 to the first gear 48 is set to be greater than twice the reduction ratio of the fourth gear 51 to the second gear 49. Specifically, for example, the reduction ratio of the fourth gear 51 to the first gear 48 is set to about 4, and the reduction ratio of the fourth gear 51 to the second gear 49 is set to be about 1.33.

When the reduction ratio of the fourth gear 51 to the first gear 48 is set to be greater than twice the reduction ratio of the fourth gear 51 to the second gear 49 as described above, the reduction ratio of the focus interlocking ring 37 to the drive motor 44 can be sufficiently large, whereby the speed, output, and efficiency of the drive motor 44 can be increased.

Further, in the interchangeable lens 3, it is preferable that the reduction ratio of the focus interlocking ring 37 to the drive motor 44 is set to be at least 300, and that the reduction ratio of the focus interlocking ring 37 to the focus operation ring 36 is set to be at least 2.

Setting the reduction ratios as described above not only ensures an optimum reduction ratio in the transmission path in each of the autofocusing action and the manual focusing action and hence increases the speed, output, and efficiency of the drive motor 44 but also reduces the size of the gear unit 40 and hence the size of the interchangeable lens 3.

[Embodiment of Imaging Apparatus]

Figure 10:
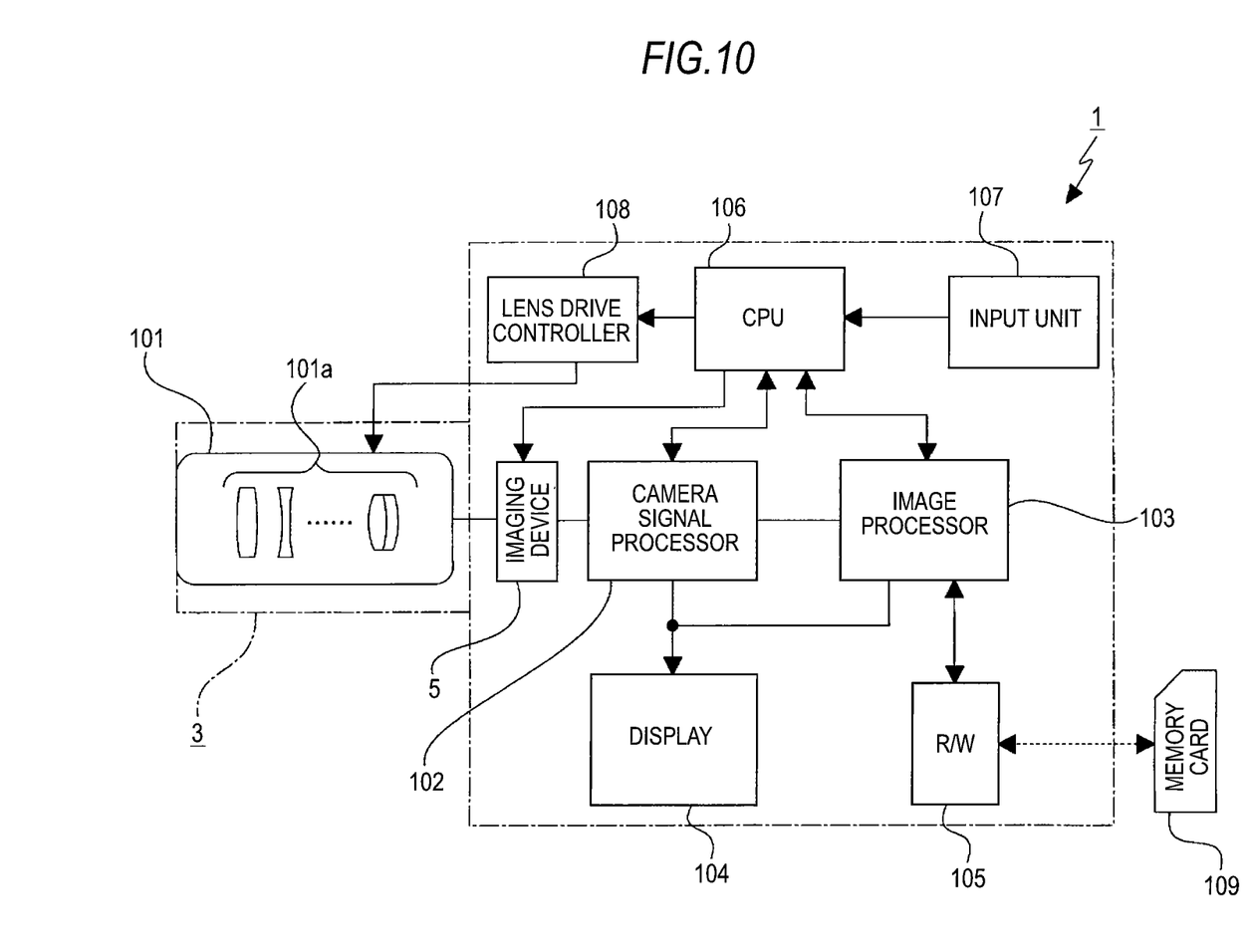
FIG. 10 is a block diagram of an imaging apparatus.

FIG. 10 is a block diagram of an interchangeable-lens-type digital camera as an imaging apparatus according to an embodiment of the present technology.

The imaging apparatus (digital camera) 1 includes a camera block 101, which is responsible for imaging capability, a camera signal processor 102, which performs analog-digital conversion and other types of signal processing on a captured image signal, and an image processor 103, which records and reproduces the resultant image signal. The imaging apparatus 1 further includes a display 104, such as an LCD (liquid crystal display), which displays a captured image and other information, a R/W (reader/writer) 105, which writes and reads the image signal to and from a memory card 109, a CPU (central processing unit) 106, which controls the entire imaging apparatus 1, an input unit 107, which is formed of a variety of input operation portions 4a, 4a, . . . and other components operated by a user as necessary, and a lens drive controller 108, which controls driving of optical elements 101a, such as lenses and lens groups, disposed in the camera block 101.

The camera block 101 is disposed, for example, in the interchangeable lens 3 and includes an optical system 101a formed, for example, of lenses and lens groups.

The camera single processor 102 converts an output signal from an imaging device 5 into a digital signal, performs noise removal and image quality correction, converts the digital signal into brightness/color difference signals, and performs a variety of other types of signal processing.

The image processor 103 performs compression encoding and decompression decoding on an image signal based on a predetermined image data format, performs data specification conversion, such as resolution conversion, and performs other types of image processing.

The display 104 has a function of displaying a variety of data, such as user's operation via the input unit 107 and captured images.

The R/W 105 writes image data encoded by the image processor 103 to the memory card 109 and reads image data recorded on the memory card 109.

The CPU 106 functions as a control processor that controls circuit blocks provided in the imaging apparatus 1 and controls each of the circuit blocks based, for example, on an instruction input signal from the input unit 107.

The input unit 107 outputs an instruction input signal according to user's operation to the CPU 106.

The lens drive controller 108 controls a motor or any other actuator (not shown) that drives the lenses in the optical system 101a based on a control signal from the CPU 106.

The memory card 109 is, for example, a semiconductor memory detachable from a slot connected to the R/W 105.

Actions in the imaging apparatus 1 will next be described.

In an imaging standby state, an image signal captured by the camera block 101 is outputted to the display 104 via the camera single processor 102 and displayed as a camera-through image on the display 104 under the control of the CPU 106. Further, when a zooming instruction input signal is inputted from the input unit 107, the CPU 106 outputs a control signal to the lens drive controller 108, and a predetermined lens or lens group in the optical system 101a is moved under the control of the lens drive controller 108.

When a shutter (not shown) in the camera block 101 is operated in response to an instruction input signal from the input unit 107, the camera signal processor 102 outputs a captured image signal to the image processor 103, which performs compression encoding on the image signal and converts the encoded image signal into digital data expressed in a predetermined data format. The converted data is outputted to the R/W 105, which writes the data to the memory card 109.

Focusing is performed, for example, as follows. When the shutter button 4a in the input unit 107 is pressed halfway or fully pressed for recording (imaging), or when the focus operation ring 36 of the interchangeable lens 3 is operated, the lens drive controller 108 moves a predetermined lens or lens group in the optical system 101a based on a control signal from the CPU 106.

To reproduce image data recorded on the memory card 109, predetermined image data is read from the memory card 109 via the R/W 105 in response to user's operation through the input unit 107. The image processor 103 performs decompression decoding on the read image data, and an image signal to be reproduced is then outputted to the display 104 and displayed thereon as a reproduced image.

BRIEF

As described above, in the imaging apparatus 1, the reduction ratio of the fourth gear 51 to the first gear 48, which are rotated in the autofocusing action, is set to be greater than the reduction ratio of the fourth gear 51 to the second gear 49, which are rotated in the manual focusing action.

As a result, an appropriate reduction ratio is provided in the transmission system having a small number of gears in each of the autofocusing action and the manual focusing action, whereby size reduction and operability improvement are achieved.

Further, the first to fourth gears are configured as follows. A sun gear is used as the first gear 48; an internal gear coaxial with the first gear 48 is used as the second gear 49; planetary gears that rotate on its axis and revolves around the first gear 48 is used as the third gears 50, 50, . . . ; and a planetary carrier is used as the fourth gear 51.

Using the thus configured planetary gear mechanism allows a mechanism that provides desired reduction ratios to be readily configured, whereby a desired reduction ratio in each transmission path can be provided based on a simple configuration.

Further, since each of the first gear 48, the second gear 49, the third gears 50, 50, . . . , and the fourth gear 51 is a spur gear, the space occupied by each of the gears is reduced, contributing to size reduction and simplification of the structure.

Moreover, using a DC motor as the drive motor 44 allows a high-output motor to be used as the drive motor 44, whereby the speed, output, and efficiency of the drive motor 44 can be increased.

The above description has been made with reference to the case where the focusing action is performed by the lens drive unit 59. Alternatively, for example, the lens drive unit may drive a mechanism that performs auto-zooming action and manual zooming action.

Present Technology

The present technology can also be configured as follows.

(1) A lens drive unit including a driven member that moves a lens in an optical axis direction, a first gear rotated by a drive force of a drive motor, a second gear rotated by a drive force of a manual operation section, a third gear that engages with the first gear and the second gear and is rotated when the first gear is rotated but the second gear is not rotated whereas rotated when the second gear is rotated but the first gear is not rotated, and a fourth gear rotated when the third gear is rotated to transmit the drive force of the drive motor or the drive force of the manual operation section to the driven member, wherein the reduction ratio of the fourth gear to the first gear is set to be greater than the reduction ratio of the fourth gear to the second gear.

(2) The lens drive unit described in (1), wherein a sun gear is used as the first gear, an internal gear coaxial with the first gear is used as the second gear, a planetary gear that rotates on an axis thereof and revolves around the first gear is used as the third gear, and a planetary carrier is used as the fourth gear.

(3) The lens drive unit described in (1) or (2), wherein the reduction ratio of the fourth gear to the first gear is set to be greater than twice the reduction ratio of the fourth gear to the second gear.

(4) The lens drive unit described in any of (1) to (3), wherein each of the first gear, the second gear, the third gear, and the fourth gear is a spur gear.

(5) The lens drive unit described in any of (1) to (4), wherein a DC motor is used as the drive motor.

(6) The lens drive unit described in any of (1) to (5), wherein the driven member is rotated when the fourth gear is rotated, the manual operation section is operated to rotate, the reduction ratio of the driven member to the drive motor is set at 300 or greater, and the reduction ratio of the driven member to the manual operation section is set at 2 or greater.

(7) The lens drive unit described in any of (1) to (6), wherein the manual operation section is operated to rotate, and the manual operation section is configured to be rotatable by an angle greater than or equal to 90° but smaller than or equal to 120°.

(8) An imaging apparatus including a lens drive unit that drives a lens and an imaging device that converts an optical image captured through the lens into an electric signal, wherein the lens drive unit includes a driven member that moves the lens in an optical axis direction, a first gear rotated by a drive force of a drive motor, a second gear rotated by a drive force of a manual operation section, a third gear that engages with the first gear and the second gear and is rotated when the first gear is rotated but the second gear is not rotated whereas rotated when the second gear is rotated but the first gear is not rotated, and a fourth gear rotated when the third gear is rotated to transmit the drive force of the drive motor or the drive force of the manual operation section to the driven member, and the reduction ratio of the fourth gear to the first gear is set to be greater than the reduction ratio of the fourth gear to the second gear.

The specific shapes and structures of the portions shown in the embodiments described above are all presented only by way of example of implementing the present technology and should not be used to construe the technical range of the present technology in a limited sense.

The present disclosure contains subject matter related to that disclosed in Japanese Priority Patent Application JP 2012-134776 filed in the Japan Patent Office on Jun. 14, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A lens drive unit, comprising:
a driven member configured to move a lens in an optical axis direction;
a first gear configured to rotate by a drive force of a drive motor;
a second gear configured to rotate by a drive force of a manual operation section;
a third gear configured to be engaged with the first gear and the second gear, wherein the third gear is configured to rotate in an event the first gear is rotated but the second gear is not rotated and in an event the second gear is rotated but the first gear is not rotated; and
a fourth gear configured to rotate in an event the third gear is rotated to transmit the drive force of the drive motor or the drive force of the manual operation section to the driven member,
wherein a support shaft portion of the first gear is configured to be inserted into a feed gear portion of the fourth gear, and
wherein a reduction ratio of the fourth gear to the first gear is set to be greater than a reduction ratio of the fourth gear to the second gear.

2. The lens drive unit according to claim 1,
wherein a sun gear is used as the first gear,
an internal gear coaxial with the first gear is used as the second gear,
a planetary gear configured to rotate on an axis thereof and revolve around the first gear is used as the third gear, and
a planetary carrier is used as the fourth gear.

3. The lens drive unit according to claim 1, wherein the reduction ratio of the fourth gear to the first gear is set to be greater than twice the reduction ratio of the fourth gear to the second gear.

4. The lens drive unit according to claim 1, wherein each of the first gear, the second gear, the third gear, and the fourth gear is a spur gear.

5. The lens drive unit according to claim 1, wherein a DC motor is used as the drive motor.

6. The lens drive unit according to claim 1, wherein
the driven member is rotated in an event the fourth gear is rotated,
the manual operation section is operated to rotate,
a reduction ratio of the driven member to the drive motor is set at 300 or greater, and
a reduction ratio of the driven member to the manual operation section is set at 2 or greater.

7. The lens drive unit according to claim 1, wherein
the manual operation section is operated to rotate, and
the manual operation section is configured to be rotatable by an angle greater than or equal to 90° but smaller than or equal to 120°.

8. An imaging apparatus, comprising:
a lens drive unit configured to drive a lens; and
an imaging device configured to convert an optical image captured through the lens into an electric signal, wherein the lens drive unit includes:
  a driven member configured to move the lens in an optical axis direction,
  a first gear configured to rotate by a drive force of a drive motor,
  a second gear configured to rotate by a drive force of a manual operation section,
  a third gear configured to be engaged with the first gear and the second gear, wherein the third gear is configured to rotate in an event the first gear is rotated but the second gear is not rotated and in an event the second gear is rotated but the first gear is not rotated, and
  a fourth gear configured to rotate in an event the third gear is rotated to transmit the drive force of the drive motor or the drive force of the manual operation section to the driven member, wherein a support shaft portion of the first gear is configured to be inserted into a feed gear portion of the fourth gear, and
wherein a reduction ratio of the fourth gear to the first gear is set to be greater than a reduction ratio of the fourth gear to the second gear.

* * * * *